United States Patent Office 3,416,930
Patented Dec. 17, 1968

3,416,930
ACID COMPOSITIONS
Riyad R. Irani, St. Louis, Mo., assignor to Monsanto
Company, St. Louis, Mo., a corporation of Delaware
No Drawing. Filed May 28, 1965, Ser. No. 459,939
11 Claims. (Cl. 99—28)

ABSTRACT OF THE DISCLOSURE

Food compositions such as beverages and gels containing as an acidulating agent an amino tri(lower alkylidene phosphonic acid).

---

This invention relates generally to acid-containing food compositions and, more particularly, to food compositions, especially dry mix food compositions including effervescent food compositions, containing a novel acidulating agent.

Organic food acids, such as citric, tartaric, adipic, fumaric and lactic acids are some of the known acidulating agents which can be used in edible compositions to provide a desirable acid taste or tang and/or to provide an acid pH. Citric acid and fumaric acid are the predominantly used organic food acids in edible compositions. As is well known, however, the foregoing organic acids all have limitations such as, for example, citric acid is hygroscopic and fumaric acid is not readily soluble in cold water, which oftentimes presents problems in their use or seriously restricts their use. As can be appreciated, therefore, an organic acidulating agent which can be used in food compositions and which minimizes or obviates the limitations of conventionally used organic food acids would represent an advancement in this art.

It is, therefore, an object of the present invention to provide food compositions containing a novel acidulating agent.

It is another object of the present invention to provide dry mix food compositions including effervescent food compositions containing a novel acidulating agent.

It is a further object of the present invention to provide an organic acidulating agent as an additive in food compositions which minimizes or obviates the limitations of conventionally used organic acids, such as citric acid and fumaric acid.

The above objects, as well as other objects of this invention, can be accomplished by incorporating into food compositions an amino tri(lower alkylidene phosphonic acid) having the formula

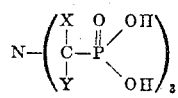

wherein X and Y are members selected from the group consisting of hydrogen and lower alkyl groups (1–4 carbon atoms).

Amino tri(lower alkylidene phosphonic acid) compounds illustrative of the invention include:

(1) amino tri(methylene phosphonic acid)
(2) amino tri(ethylidene phosphonic acid)
(3) amino tri(isopropylidene phosphonic acid)
(4) amino tri(butylidene phosphonic acid)
(5) amino mono(ethylidene phosphonic acid)di(methylene phosphonic acid)
(6) amino di(methylene phosphonic acid)mono(isopropylidene phosphonic acid)
(7) amino di(methylene phosphonic acid)mono(butylidene phosphonic acid).

The amino tri(lower alkylidene phosphonic acids) may be prepared by various means, one of which comprises reacting ammonia, a suitable carbonyl containing compound (ketone or aldehyde) and orthophosphorous acid preferably at elevated temperatures (about 70–200° C.) and in an aqueous medium having a pH below about 4 and preferably in the presence of a halide compound such as HCl.

The amino tri(lower alkylidene phosphonic acids) can be advantageously used as acidulating agents because such are, among other things, some of the strongest organic acids known, can be readily formulated into food compositions and are compatible in such compositions, and are non-hygroscopic and readily soluble in both hot and cold water.

As being illustrative of their acidity, the following table compares the acid value of amino tri(methylene phosphonic acid) with other common food acids with the pK of the strongest hydrogen being shown:

TABLE 1

| Acid: | pK$_1$ |
|---|---|
| (1) Tartaric (99.5%) | 3.02 |
| (2) Citric (91%) | 3.06 |
| (3) Lactic (40%) | 3.86 |
| (4) Phosphoric (75%) | 2.12 |
| (5) Amino tri(methylene phosphonic acid) (50%) | <2.0 |

As being illustrative of their acidity and solubility, the following table compares amino tri(methylene phosphonic acid) with the conventionally used organic food acids citric acid and fumaric acid:

TABLE 2

| Acid | Solubility in water (25° C.), percent | Rate of solubility | Percent needed to achieve in water (25° C.) | |
|---|---|---|---|---|
| | | | pH–3 | pH–2.5 |
| (1) Citric | 58 | Rapid | 0.041 | 0.20 |
| (2) Fumaric | 0.7 | Slow | 0.024 | 0.20 |
| (3) Aminotri(methylene phosphonic acid) | 60 | Rapid | 0.009 | 0.05 |

Typical food compositions in which the novel acidulating agents of the present invention can be used include beverage compositions, such as, carbonated beverage mix compositions (both dry and liquid), dry kola mix compositions, and fruit flavored compositions; non-nutritive sweetened food compositions; gelatin food compositions; and aliginate jelly and dessert compositions. These specific areas of utilization are by no means the extent of their use, and, therefore, the invention is not intended to be limited thereto.

In general, effective amounts of the acidulating agent which can be used in food compositions vary depending upon, inter alia, type of food composition, other additives present and the like and usually amounts which impart a pH from about 2.0 to 5.5 are suitable. Usually such amounts can range as widely as from about 0.1% to as high as 60 to 70% by weight of the composition. In some cases buffering salts can be advantageous used with the acidulating agent and such include the alkali metal and alkaline earth metal phosphates with sodium and calcium phosphates being preferred.

The invention is not to be limited to any particular method of preparing the food composition containing the acidulating agent. The acidulating agent may be mechanically mixed in, slurried with or dissolved in the food composition or, if desired, the acidulating agent can be premixed with other additives as well as being added simultaneously or separately with other additives to the food composition. In addition the food compositions can take many and various kinds of forms such as granulated or powdered mixes, liquids, tablets of various shapes and sizes, and the like depending upon the purpose for which they are to be used.

BEVERAGE COMPOSITIONS

The acidulating agents of the present invention can be used advantageously in beverage compositions, particularly beverage mix compositions. In general, a beverage mix composition containing the acidulating agent of the present invention and a flavor-base mixture of flavoring and coloring materials in amounts as desired to produce the color and flavor of the beverage is all that is required. Nutritive or non-nutritive sweeteners can be added to the drink after it is formulated with water or, if desired, can be added to the beverage mix prior to formulating with water. Additionally, it is preferred in some cases to add a carrier agent such as dextrose monohydrate to the beverage mix in order to aid the dispersion and distribution of the flavoring agent in the drink. Such carrier agents can be used in any amount as desired; however, amounts from about 5 to 50 times the weight of the flavoring agent are usually adequate. Small amounts, i.e., usually less than 10% by weight of the composition, of other ingredients such as antioxidants, clouding oils, buffer salts, such as the alkali metal or alkaline earth metal phosphates, and the like may be included, if desired, into the beverage mix composition. Generally amounts of the acidulating agent which are effective to give the desired taste or tang, that is, a pH of from about 2.0 to 5.5 can be used and such can vary depending upon other ingredients used in the composition. Usually such amounts can vary from about 1% to as high as 70% by weight of the additives in the composition.

If an effervescent beverage composition is desired, a carbonate containing factor can be used in the composition. Such carbonate-containing materials which are suitable include those compounds containing essentially carbonate which are capable of reacting with the acidulating agent of the present invention with the release of carbon dioxide when contacted with sufficient water. In particular are the water-soluble carbonate materials, particularly the inorganic carbonates, and more particularly the alkali metal carbonate materials, such as, sodium carbonate, sodium bicarbonate, sodium sesquicarbonate, potassium carbonate, potassium bicarbonate, lithium carbonate, lithium bicarbonate, ammonium carbonate, ammonium bicarbonate, ammonium sesquicarbonate and the like including mixtures of these. Ammonia is included herein as an alkali metal in view of the fact that the ammonium salts exhibit substantially the same chemical properties as the alkali metal salts such as the sodium salts and potassium salts. Because the sodium, potassium and ammonium carbonates are, in general, the most widely used carbonates and because such carbonates are relatively inexpensive as well as being readily available, they are the preferred alkali metal carbonates. In some cases, calcium carbonate or calcium carbonate and some other carbonate, i.e., an alkali metal carbonate, a double salt of calcium and magnesium carbonate (dolomite), or, in general, any double compound which includes calcium carbonate and some other alkaline earth or alkali metal radical, can be used. In such cases it is preferred that at least about 50% of the carbonate factor be calcium carbonate. Again, depending upon the desired taste or tang, the degree of effervesing, other additives and the like, the carbonate factor and the acidulating agent are generally used in amounts to give a pH of from about 2.5 to 5.5 Usually such amounts vary widely and can range from about 10:1 to 1:10 on a weight ratio basis of carbonate-containing factor to acidulating agent. Also, if desired, the effervescent beverage mix can contain, in addition to the carbonate factor and acidulating agent, a sweetener, a flavoring agent, coloring and, optionally, a carrier for the flavor. The beverage composition, if in the concentrate form, can be prepared in dry free flowing mixtures, concentrate liquid solutions or in tablet form. The following examples are illustrative of beverage compositions containing an acidulating agent of the present invention as well as methods which can be used to prepare the compositions.

Example 1

A carbonated soft drink is prepared from the following:

| Additive: | Amount |
|---|---|
| Sodium carbonate | grams__ 2 |
| Amino tri(methylene phosphonic acid) | __do____ 4 |
| Sugar | __do____ 25 |
| Flavor and coloring | As desired |
| Water | ounces__ 8 |

The flavoring added as spray dried solids on gum arabic, is mixed with the other above additives, except water, and blended thoroughly to form a dry mix. The dry mix is then added to the water to form a carbonated soft drink which exhibits a good soda taste.

Example 2

A carbonated soft drink is prepared from the following:

| Additive: | Amount |
|---|---|
| Sodium bicarbonate | grams__ 3 |
| Ammonium carbonate | __do____ 1 |
| Amino tri(methylene phosphonic acid) | __do____ 5 |
| Sugar | __do____ 25 |
| Flavor and coloring | As desired |
| Water | ounces__ 8 |

The above additives are thoroughly blended together to prepare a carbonated soft drink which exhibits good taste.

Example 3

A fruit flavored beverage mix concentrate is prepared from the following:

| Additive: | Amount (grams) |
|---|---|
| Grape flavor | .5 |
| Color—certified (purple) | .1 |
| Sucrose | 60 |
| Amino tri(methylene phosphonic acid) | 40 |

The above additives are blended together by admixing to form a dry free flowing mix concentrate which is dissolved in cold water in amounts of about 20 grams per 2 quarts water to prepare a fruit flavored beverage. If desired the above additives, except the sugar, can be blended together, added to the water, and the sugar added separately.

Example 4

A grape carbonate concentrate is prepared from the following:

| Additive: | Amount (grams) |
|---|---|
| Potassium bicarbonate | 135 |
| Amino tri(methylene phosphonic acid) | 250 |
| Grape flavoring | 5 |
| Certified purple dye | .4 |

The above additives are blended by admixing and added to water in amounts of about 35 grams per 7 ounces of water. To this solution can be added 1500 grams of sugar to achieve the desired sweetened carbonate drink. If desired, the sugar can be admixed with the above additives prior to dissolving in water.

Example 5

A root beer carbonate concentrate is prepared from the following:

| Additive: | Amount (grams) |
|---|---|
| Calcium carbonate | 90 |
| Sodium bicarbonate | 37 |
| Amino tri(methylene phosphonic acid) | 100 |
| Root beer flavor | .05 |
| Certified caramel-colored dye | 13 |
| Sugar | 600 |

The above additives can be admixed and dissolved in water to prepare a carbonate drink by following the procedure as described in Example 4.

Example 6

A kola carbonate concentrate is prepared from the following:

| Additive: | Amount (grams) |
|---|---|
| Sodium bicarbonate | 220 |
| Amino tri(methylene phosphonic acid) | 200 |
| Monocalcium phosphate | 5 |
| Kola flavoring | 10 |
| Certified caramel-colored dye | .6 |

The above additives can be admixed and dissolved in water to prepare a carbonated soft drink by the procedure described in Example 4. Sugar can be added in amounts to give the desired sweetening.

Example 7

A kola carbonate concentrate is prepared from the following:

| Additive: | Amount (grams) |
|---|---|
| Potassium bicarbonate | 185 |
| Amino tri(methylene phosphonic acid) | 200 |
| Kola flavoring | 2 |
| Certified caramel-colored dye | .15 |

The above additives can be admixed and dissolved in water by following the procedure as described in Example 4. Sugar can be added in amounts to give the desired sweetening.

Example 8

A soft carbonated drink is prepared from the following:

| Additive: | Amount (parts by weight) |
|---|---|
| Sugar | 10 |
| Amino tri(methylene phosphonic acid) | .12 |
| Disodium phosphate | .01 |
| Carbonated water | 89.87 |
| Lemon-lime oils | As desired |

The above additives are thoroughly mixed and dissolved in the carbonated water to form a carbonated soft drink.

Example 9

A soft carbonated drink is prepared from the following:

| Additive: | Amount (parts by weight) |
|---|---|
| Sugar | 10 |
| Amino tri(methylene phosphonic acid) | .03 |
| Carbonated water | 89.97 |
| Kola flavoring | .001 |
| Certified caramel-colored dye | .0002 |
| Caffeine | (¹) |
| Vanilla | (¹) |

¹ As desired for flavoring.

The above additives are thoroughly mixed and dissolved in the carbonated water to form a carbonated soft drink.

NON-NUTRITIVE SWEETENED FOOD COMPOSITIONS

The acidulating agents of the present invention can be used advantageously with non-nutritive sweeteners, such as, the cyclamates, saccharin, and the like and especially the alkali metals and alkaline earth metal salts of the cyclamates and saccharin, in edible food compositions. For example, such synthetically sweetened drinks have a taste very similar to sugar based drinks while citric acid synthetically sweetened drinks have an undesirably sweet aftertaste. In general, amounts which are especially suited for use with the non-nutritive sweeteners range from about 1,000:1 to 5:1 on a weight ratio basis of the acidulating agents to the sweeteners, with such amounts varying depending upon, among other things, the other additives present in the composition and the type of use intended for the acidulating agent and the sweeteners. Such can be formulated containing other additives to form such food compositions as carbonate beverage mixes, gelatin desserts, and the like. The other additives which can be incorporated into such food compositions are the conventionally used additives in such compositions as well understood in this art. Amounts of the other additives can vary but are generally conventionally used amounts. The following examples are illustrative of compositions of the present invention containing artificial sweeteners as well as methods which can be used to prepare the compositions.

Example 10

An effervescent non-nutritive sweetened concentrate tablet is prepared from the following:

| Additive: | Amount (grams) |
|---|---|
| Sodium bicarbonate | grams 11 |
| Amino tri(methylene phosphonic acid) | do 15 |
| Edible vegetable oil | liter .17 |
| Sodium cyclamate | gram 1 |
| Calcium saccharin | do .1 |
| Cherry flavoring | do .7 |
| Red coloring | do .08 |

The above additives are thoroughly blended and the resulting granular mixture is then compressed into tablets weighing about 2 grams each. When dropped into a glass of water the tablets effervescence and the resulting solution exhibits good tasting properties.

Example 11

A non-nutritive sweetened concentrate is prepared from the following:

| Additive: | Amount (grams) |
|---|---|
| Calcium carbonate | 400 |
| Potassium carbonate | 150 |
| Amino tri(methylene phosphonic acid) | 500 |
| Grape flavoring | 75 |
| Certified purple coloring | 1.5 |
| Calcium cyclamate | 0.15 |
| Sodium saccharin | 0.015 |

The above additives are thoroughly blended by mixing and about 35 grams of the composition can be used with about 7 ounces of water to give a grape flavored drink.

Example 12

A gelatin jelly dessert product is prepared from the following:

| Additive: | Amount (grams) |
|---|---|
| Gelatin | 4.0–5.0 |
| Mono- and di-sodium phosphate | 0.3 |
| Calcium cyclamate | 0.14 |
| Sodium saccharin | 0.014 |
| Color (strawberry) | 0.28 |
| Flavor (strawberry) | 0.16 |
| Amino tri(methylene phosphonic acid) | 0.5 |

The above additives are blended together by admixing and this dry mix is added to about 1 cup of hot water. The solution is allowed to gel and when eaten exhibits good flavor properties.

GELATIN FOOD COMPOSITIONS

The acidulating agents of the present invention can be used advantageously with gelatin in edible food compositions. In general, an edible gel, as a gelatin product, can be prepared by combining gelatin, the acidulating agent of the present invention, and a sweetening agent. Additionally, if desired, a small amount of a flavor, either natural, synthetic or admixtures thereof, can be used in the gelatin composition. Further, if desired, a relatively quick-setting gelatin dessert composition can be prepared by including salts of organic food acids such as acetates, lactates, citrates, tartarates (especially the alkali metal salts) as is well understood in this art. A satisfactory gelatin composition, suitable as a dessert, can contain from about 7 to 15 parts by weight of gelatin, 80 to 95 parts by weight of sugar and 0.5 to 2 parts by weight of the acidulating agent of the present invention. The following examples are illustrative of compositions of the present invention containing gelatin as well as methods which can be used to prepare the compositions.

Example 13

| Additive: | Amount (grams) |
| --- | --- |
| Sugar | 82 |
| Gelatin | 10 |
| Crystallized dextrose | 5 |
| Amino tri(methylene phosphonic acid) | .8 |
| Orange flavor and coloring | .2 |

The above additives are thoroughly blended by mixing, dissolved in about 500 grams of water, and refrigerated until gelled. The gelled gelatin dessert exhibits good flavor properties.

Example 14

A gelatin dessert composition is prepared by the following:

| Additive: | Amount (grams) |
| --- | --- |
| Sugar | 88 |
| Gelatin | 10 |
| Amino tri(methylene phosphonic acid) | 1.2 |
| Flavor and color in small amounts. | |

The above additives are thoroughly blended by mixing, dissolved in about 50 grams of water, and refrigerated until gelled. The gelled gelatin dessert exhibits good flavor properties.

ALGINATE JELLY AND DESSERT COMPOSITIONS

The acidulating agents of the present invention can be used advantageously with alkinates in edible food compositions, such as jellies and dessert compositions (particularly cold water desserts) and, in general, for jellies it is preferred that a water-soluble alginate be employed such as sodium alginate in conjunction with an inorganic salt containing a cation which will insolubilize the alginate, such as, for example, calcium phosphate. For dessert compositions, it is preferred that the alginates which are used be carboxy methyl alginate having a relatively high viscosity, such as a carboxy methyl alginate having a viscosity of at least 1000 cps. in a 5% water solution, in conjunction with an inorganic salt such as dicalcium phosphate. In general, the amounts of the acidulating agent which are especially suited for use with the alginates range from about 3:1 to about 1:3 on a weight ratio basis with the alginate, although such amounts will usually vary depending on the other additives present in the composition, whether a jelly or dessert is to be prepared and the like. Additives which can also be used in these compositions include sweeteners, flavorings, coloring materials and the like. The following examples are illustrative of compositions of the present invention containing alginates as well as methods which can be used to prepare the compositions.

Example 15

A dry mix concentrate is prepared from the following:

| Additive: | Amount (grams) |
| --- | --- |
| Sodium alginate | 4.6 |
| Sodium carbonate | 2.0 |
| Tricalcium phosphate | 0.6 |
| Sugar | 80.0 |
| Amino tri(methylene phosphonic acid) | 4.0 |
| Strawberry flavor | 0.16 |
| Red color | 0.04 |

The above additives are blended in a conventional mixture to form a homogeneous admixture, added to about 500 cc. of water and agitated with a rotary hand whisk for about 30 seconds. The thickened solution is then poured into a mold to set and turned out in about 20 minutes. The resulting jelly exhibits good flavor and consistency properties.

Example 16

A dry mix concentrate is prepared from the following:

| Additive: | Amount (grams) |
| --- | --- |
| Sodium carboxy methyl alginate | 5.0 |
| Dicalcium phosphate | 1.0 |
| Amino tri(methylene phosphonic acid) | 1.5 |
| Dessert grade sugar | 77.0 |

The above additives are blended together by admixing and added to 2 cups of cold water while stirring briskly by hand for about 1 minute. The resultant mixture is then poured into gel cups and let stand at room temperature (about 25° C.). In about 30 to 60 minutes the desserts are ready for eating.

In addition, good results can be obtained by using substantially similar amounts of other amino tri(lower alkylidene phosphonic acids) in the foregoing examples, such as, amino tri(ethylidene phosphonic acid), amion tri(butylidene phosphonic acid), amino mono(ethylidene phosphonic acid) di(methylene phosphonic acid), and amino di(methylene phosphonic acid) mono(propylidene phosphonic acid).

If desired, the acidulating agents of the present invention can be used with other organic food acids, such as citric, fumaric, tartaric, malic, and lactic acids, and phosphoric acid in order to obtain not only the advantages of the acidulating agent of the present invention but also the advantages of the foregoing acids. Usually amounts on a weight ratio basis of any of the foregoing food acids or mixtures thereof to the acidulating agent of the present invention of from about 100:1 to 1:100 are sufficient with from about 10:1 to 1:10 being preferred.

What is claimed is:

1. A beverage composition containing, in addition to a flavoring agent, an amino tri(lower alkylidene phosphonic acid) as an acidulating agent.

2. The composition of claim 1, wherein said composition is a dry mix concentrate composition containing from about 1% to 70% by weight of said composition of amino tri(methylene phosphonic acid).

3. An effervescent beverage concentrate composition containing, in addition to a flavoring agent, a carbonate-containing factor and, as an acidulating agent, an amino tri(loweralkylidene phosphonic acid).

4. The composition of claim 3, wherein said carbonate-containing factor and said acidulating agent is present on a weight ratio basis of from about 10:1 to 1:10.

5. The composition of claim 4, wherein said acidulating agent is amino tri(methylene phosphonic acid).

6. A non-nutritive sweetened food composition containing, in addition to a non-nutritive sweetener selected from the group consisting of cyclamates, saccharin and mixtures thereof, an amino tri(lower alkylidene phosphonic acid) as an acidulating agent.

7. The composition of claim 6, wherein said nonnutritive sweeteners and said acidulating agent are present on a weight ratio basis of from about 1,000:1 to 5:1.

8. The composition of claim 7, wherein said acidulating agent is amino tri(methylene phosphonic acid).

9. A gelatin composition comprising gelatin and, as an acidulating agent, an amino tri(lower alkylidene phosphonic acid) on a weight ratio basis of from about 30:1 to 7:2.

10. A gelatin composition comprising from about 7 to 15 parts of gelatin (80 to 85 parts of sugar and 0.5 to 2 parts of an amino tri(lower alkylidene phosphonic acid) as an acidulating agent.

11. The gelatin composition of claim 10, wherein said acidulating agent is amino tri(methylene phosphonic acid).

References Cited

UNITED STATES PATENTS

| | | | |
|---|---|---|---|
| 2,949,366 | 8/1960 | Hunter et al. | 99—131 |
| 2,984,543 | 5/1961 | Smith | 99—78 X |
| 2,999,754 | 10/1961 | Lauck et al. | 99—78 |
| 3,018,180 | 1/1962 | Lauck et al. | 99—130 |
| 3,060,032 | 11/1962 | Glicksman | 99—131 |
| 3,234,124 | 2/1966 | Irani | 210—38 |

A. LOUIS MONACELL, *Primary Examiner.*

S. B. DAVIS, *Assistant Examiner.*

U.S. Cl. X.R.

99—78, 79, 130, 131

PO-1050
(5/69)

UNITED STATES PATENT OFFICE
CERTIFICATE OF CORRECTION

Patent No. 3,416,930         Dated December 17, 1968

Inventor(s) Riyad R. Irani

It is certified that error appears in the above-identified patent and that said Letters Patent are hereby corrected as shown below:

Column 7, line 34, the figures reading "500" should read -- 490 --; Column 7, line 48, the figures reading "50" should read -- 500 --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents